(12) United States Patent
Vagle et al.

(10) Patent No.: US 9,400,223 B2
(45) Date of Patent: *Jul. 26, 2016

(54) RETRIEVABLE PRESSURE SENSOR

(75) Inventors: Paal Martin Vagle, Asker (NO); Bjørn Erik Seeberg, Oslo (NO)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 145 days.

This patent is subject to a terminal disclaimer.

(21) Appl. No.: 14/239,385

(22) PCT Filed: Sep. 7, 2012

(86) PCT No.: PCT/NO2012/050170
§ 371 (c)(1),
(2), (4) Date: May 1, 2014

(87) PCT Pub. No.: WO2013/036144
PCT Pub. Date: Mar. 14, 2013

(65) Prior Publication Data
US 2014/0298914 A1    Oct. 9, 2014

(30) Foreign Application Priority Data
Sep. 8, 2011    (NO) .................................. 20111218

(51) Int. Cl.
*G01L 7/08*    (2006.01)
*G01L 19/00*    (2006.01)
*G01L 19/06*    (2006.01)

(52) U.S. Cl.
CPC ................. *G01L 7/082* (2013.01); *G01L 19/00* (2013.01); *G01L 19/003* (2013.01); *G01L 19/0046* (2013.01); *G01L 19/0645* (2013.01); *G01L 19/0672* (2013.01); *Y10T 29/49815* (2015.01)

(58) Field of Classification Search
CPC ... G01L 19/00; G01L 19/003; G01L 19/0046; G01L 19/0672; G01L 7/082; G01L 19/0645; Y10T 29/49815
USPC .............................................. 73/716; 29/426
See application file for complete search history.

(56) References Cited

U.S. PATENT DOCUMENTS 2,667,184 A * 1/1954 Hailer ...................... G01G 5/00
                                                      177/208
2,877,799 A    3/1959 Hildenbrandt, Jr.
(Continued)

FOREIGN PATENT DOCUMENTS

CN    1131462 A    9/1996
CN    101308054 A    11/2008
(Continued)

OTHER PUBLICATIONS

Unofficial English Translation of Chinese Office Action issued in connection with corresponding CN Application No. 201280043534.1 on Mar. 24, 2015.
(Continued)

*Primary Examiner* — Lisa Caputo
*Assistant Examiner* — Philip Cotey
(74) *Attorney, Agent, or Firm* — Cooper Legal Group, LLC (57) ABSTRACT

The present invention relates to a retrievable pressure sensor for in situ measurement of pressure in a process fluid in a pipe/chamber. The pressure sensor comprising a pressure-transferring device and an outer sensor part having a pressure sensing element attached at a distance from the pipe/chamber where the pressure is to be measured. The pressure-transferring device comprises a first device for sealing attachment in an opening in a wall of the pipe/chamber where the pressure is to be measured, and has a first separation diaphragm for separating between the process fluid and the pressure-transferring fluid. The pressure-transferring device further comprises a second device for attachment at a distance from the pipe/chamber where the pressure is to be measured. The pressure-transferring device comprises a first cavity with a pressure-transferring fluid, wherein the first cavity comprising a capillary tube for pressure transferring connection between the first device and the second device.

25 Claims, 9 Drawing Sheets

(56) References Cited

U.S. PATENT DOCUMENTS

| | | | |
|---|---|---|---|
| 3,102,427 A | 9/1963 | Trostel | |
| 3,986,399 A | 10/1976 | Satou et al. | |
| 4,227,420 A * | 10/1980 | Lamadrid | A61B 5/0215 600/488 |
| 4,923,444 A | 5/1990 | Daoud et al. | |
| 5,095,755 A | 3/1992 | Peterson | |
| 5,483,994 A | 1/1996 | Maurer | |
| 5,524,492 A | 6/1996 | Frick et al. | |
| 5,808,204 A * | 9/1998 | Chang | G01L 27/005 73/714 |
| 6,873,267 B1 | 3/2005 | Tubel et al. | |
| 7,181,980 B2 | 2/2007 | Wium | |
| 7,258,017 B1 | 8/2007 | Hedtke | |
| 7,827,866 B2 | 11/2010 | Galinsky | |
| 7,859,681 B2 | 12/2010 | Moroni et al. | |
| 9,182,307 B2 | 11/2015 | Seeberg | |
| 2001/0035052 A1* | 11/2001 | Ohmi | G01L 19/0645 73/645 |
| 2003/0200812 A1 | 10/2003 | Kuhn et al. | |
| 2004/0050168 A1 | 3/2004 | Uberreiter | |
| 2004/0234382 A1* | 11/2004 | Textor | G01L 19/0645 417/63 |
| 2006/0048580 A1 | 3/2006 | Vogler | |
| 2006/0162458 A1 | 7/2006 | Broden | |
| 2006/0162460 A1* | 7/2006 | Ooshiba | G01L 13/025 73/716 |
| 2008/0245152 A1 | 10/2008 | Louwagie et al. | |
| 2009/0107245 A1 | 4/2009 | Banholzer et al. | |
| 2012/0055669 A1 | 3/2012 | Levin et al. | |
| 2013/0004773 A1 | 1/2013 | Klun et al. | |
| 2013/0047737 A1 | 2/2013 | Vagle et al. | |

FOREIGN PATENT DOCUMENTS

| | | |
|---|---|---|
| CN | 101451895 A | 6/2009 |
| CN | 201917428 U | 8/2011 |
| DE | 3700466 A1 | 7/1988 |
| DE | 9209083 U1 | 9/1992 |
| EP | 469535 A2 | 2/1992 |
| GB | 2377239 A | 1/2003 |
| GB | 2377240 A | 1/2003 |
| GB | 2477714 A | 8/2011 |
| JP | 54138461 A | 10/1979 |
| JP | 5576924 A | 6/1980 |
| JP | 60142227 A | 7/1985 |
| NO | 20093171 A | 4/2011 |
| WO | 96/27124 | 9/1996 |
| WO | 03016673 A1 | 2/2003 |
| WO | 03034014 A2 | 4/2003 |
| WO | 2008150176 A1 | 12/2008 |
| WO | 2009067016 A1 | 5/2009 |
| WO | 2011/115502 | 9/2011 |
| WO | 2013050051 A1 | 4/2013 |

OTHER PUBLICATIONS

International Search Report issued Jun. 10, 2013 in corresponding International Application No. PCT/NO2012/050170.
International Preliminary Report on Patentability issued Nov. 28, 2013 in corresponding International Application No. PCT/NO2012/050170.
Norwegian Search Report issued Apr. 8, 2012 in corresponding Norwegian Application No. 20111218.
Norwegian Search Report issued in connection with related NO Application No. 20100384 dated Sep. 30, 2010.
Norwegian Search Report issued in connection with related NO Application No. 20100383 dated Oct. 16, 2010.
Roxar Subsea ROV Retrieval System Data Sheet, Version A-230210, Roxar, Oct. 16, 2010.
International Search Report and Written Opinion issued in connection with related PCT Application No. PCT/NO2010/000367 dated Jan. 14, 2011.
International Search Report and Written Opinion issued in connection with related PCT Application No. PCT/NO2011/000085 dated Aug. 29, 2011.
International Preliminary Report on Patentability issued in connection with related PCT Application No. PCT/NO2010/000367 dated Jan. 11, 2012.
Non-Final Rejection towards related U.S. Appl. No. 13/498,292 dated Oct. 3, 2014.
Non-Final Rejection towards related U.S. Appl. No. 13/581,968 dated Oct. 15, 2014.
Final Rejection towards related U.S. Appl. No. 13/498,292 dated Apr. 24, 2015.
Non-Final Rejection towards related U.S. Appl. No. 13/921,905 dated May 20, 2015.
International Search Report and Written Opinion issued in connection with related PCT Application No. PCT/US2015/050087 dated Dec. 18, 2015.
U.S. Appl. No. 14/543,520, filed Nov. 17, 2014, Seeberg et al.
U.S. Appl. No. 13/498,292, filed Jun. 12, 2012, Seeberg et al.
U.S. Appl. No. 13/921,905, Jun. 19, 2013, Seeberg et al.
U.S. Appl. No. 13/581,968, filed Oct. 25, 2012, Vagle et al.

* cited by examiner

RETRIEVABLE PRESSURE SENSOR

INTRODUCTION

The present invention relates to a retrievable pressure sensor for in situ measurement of pressure in a process fluid.

BACKGROUND

Retrievable sensors are sensors which can be replaced while process fluids are present in the area in which the pressure is to be measured. Such pressure sensors are attached in the pipe wall by way of a flange or bore, for example. It is known to use valve mechanisms for blocking the flow to enable the replacement of the pressure sensor. In practice, the use of valves has proven to be difficult as they are left in an open position and subject to fouling by the process fluid. It is therefore a great risk that the valve is not operable when it is finally needed for the replacement of a pressure sensor, after some 10-15 years, for example. Moreover, when valves are used it is difficult to avoid discharge of process fluid into the environment.

It is therefore a need for a pressure sensor having a reliable structure making it possible to replace pressure sensors in overpressure environments in a simple manner without rendering the pressure sensors inoperable and without having to open up the pipe wall or suspend the production/process. At the same time, the pressure sensor has to meet strict safety requirements.

For underwater installations ROVs (Remotely Operated Vehicles) are used for operating, maintenance and repair and replacement of equipment and sensors on the installation. ROVs are large and may be demanding to manoeuvre in deep ocean depths. This requires positioning of components, equipment and sensors so that an ROV in a simple way may access and perform the operations necessary. For use in underwater installations it is therefore preferable that the pressure sensor may be designed and arranged for easy replacement by an ROV. It may also be envisaged other installations and large processing plants both offshore and onshore where it will be advantageous with a retrievable sensor designed for easy access in connection with maintenance and replacement of the sensor.

SUMMARY OF THE INVENTION

The present invention provides a solution to the above problems.

The present invention relates to a design enabling the replacement of pressure sensors in overpressure scenarios, e.g. in subsea oil related applications, process plants, etc.

The present invention provides a retrievable pressure sensor for in situ measurement of pressure in a process fluid (3) in a pipe/chamber, the pressure sensor comprising:
a pressure-transferring arrangement comprising:
  a first device for sealing attachment in an opening in a wall of the pipe/chamber where the pressure is to be measured, the first device comprising:
    a first separation diaphragm for separating between the process fluid and the pressure-transferring fluid,
  a second device for attachment at a distance from the pipe/chamber where the pressure is to be measured, the second device comprising:
    a second separation diaphragm; and
  a first cavity containing a pressure-transferring fluid, wherein the first cavity comprising a capillary tube for a pressure transferring connection between the first device and the second device, and where the pressure sensor further comprising:
an outer sensor part having a pressure sensing element, where the outer sensor part is attached at a distance from the pipe/chamber where the pressure is to be measured, the outer sensor part comprising:
  a second cavity with a pressure-transferring fluid in pressure communication with the pressure sensing element,
  a third separation diaphragm bounding the second cavity, the third separation diaphragm being configured for pressure communication with the second separation diaphragm for pressure transferral between the pressure-transferring fluid in the cavity and the pressure-transferring fluid in the second cavity, and
  a third volume surrounding the second and the third separation diaphragms when the second and the third separation diaphragms are in pressure communication.

The invention involves the use of a pressure-transferring device (pressure pad) 2 as a transfer mechanism between the pressure sensor element 4 and the process fluid 3 in which the pressure is to be measured. The pressure-transferring arrangement is attached in an opening in a wall of the pipe/chamber and remains in place when the sensor part is removed. The pressure-transferring arrangement 2 is hermetically welded to the pipe 1 or attached by way of a flange or otherwise in order to ensure a sealing engagement against the pipe wall and process fluid inside the pipe. The pressure pad 2 has a separation diaphragm at each end. The diaphragms may be equal or different. Each separation diaphragm has an associated diaphragm seat. Both diaphragm seats are provided with seat holes small enough for the respective diaphragms to completely lay down onto their respective seats and then be able to support the entire pressure from the process fluid 3 and an ambient pressure, respectively, when the outer sensor structure is removed. The pressure sensor structure includes two diaphragms 8 located adjacent to each other and serving as a transfer mechanism for the pressure of the transmission oil 7 and in the volume 4 in which the pressure element is located. Especially in subsea overpressure environments the requirements of safety and reliable design are high. The present invention may then be provided with double barriers through the use of additional diaphragms in the pressure pad, for example.

It is also described a retrievable pressure sensor for installation in an opening through a pipe or chamber wall for the in situ measurement of pressure of a process fluid in the pipe/chamber. The pressure sensor includes a pressure-transferring arrangement/pressure pad comprising: a device for sealing attachment in an opening in a wall of the pipe/chamber, a cavity containing a pressure-transferring fluid, a first separation diaphragm for separating between the process fluid and the pressure-transferring fluid, and a second separation diaphragm defining an outer boundary of the cavity containing the pressure-transferring fluid. The pressure sensor further includes an outer sensor part having a pressure sensing element, a second cavity containing a pressure-transferring fluid in pressure communication with the pressure sensing element, and a third separation diaphragm bounding the second cavity, with the third separation diaphragm being configured for pressure communication with the second separation diaphragm for transferring pressure between the pressure-transferring fluid in the cavity and the pressure-transferring fluid in the second cavity, and a third volume surrounding the second and third separation diaphragms when the second and third separation diaphragms are in pressure communication.

A pressure in the third volume is adjustable. The third volume may be adapted for injection of fluid. The pressure in the third volume is adjustable so that the sensor may be retrieved in a controlled and safe manner.

In an embodiment, the pressure-transferring arrangement may further include a first abutment surface for the first separation diaphragm, with the first abutment surface having an opening into the cavity. The second separation diaphragm also has a, second, abutment surface, with the second abutment surface having an opening into the cavity. An outer section of the second separation diaphragm may be attached to the second abutment surface by way of fasteners so that the outer section abuts against and contacts a corresponding section of the second abutment surface.

In an embodiment, the pressure sensor includes a third abutment surface for the third separation diaphragm, with the third abutment surface having an opening into the second cavity. A second outer section of the third separation diaphragm may be attached to the third abutment surface by way of fasteners so that the second outer section abuts against and contacts a corresponding outer section of the third abutment surface. The pressure sensor may include a biasing force pressing the second and third separation diaphragms together so that pressure transfer may take place between the second and third separation diaphragms. In a further embodiment the pressure sensor may also include a fourth volume in association with the first cavity, with the fourth volume being configured for receiving the pressure-transferring fluid of the first cavity. The pressure sensor may be adapted for measuring differential pressure or, alternatively, be adapted for measuring absolute pressure.

In a further aspect, the invention provides a method for retrieving a retrievable pressure sensor as defined above, the method comprising: increasing a pressure in the third volume until said pressure is higher than the process fluid pressure, pulling out the second pressure sensor part in a controlled manner until the second and third separation diaphragms are no longer in pressure communication, reducing the pressure in the third volume to a pressure equal to or lower than the process pressure, and pulling out the outer pressure sensor part.

In a further aspect, the invention provides a method for retrieving a retrievable pressure sensor as defined above, wherein the retrievable pressure sensor further includes a fourth volume in association with the first cavity, and the method comprises reducing the pressure in the first cavity until the second and third separation diaphragms are no longer in pressure communication, through the reception of fluid in the fourth volume from the first the cavity, and pulling out the outer pressure sensor part.

In a further aspect the invention provides a retrievable pressure sensor for in situ measurement of pressure in a process fluid in the pipe/chamber, the pressure sensor comprising:
  a pressure-transferring arrangement comprising:
    a first device for sealing attachment in an opening in a wall of the pipe/chamber where the pressure is to be measured, the first device comprising:
      a first separation diaphragm for separating between the process fluid and the pressure-transferring fluid, and
    a second device for attachment at a distance from the pipe/chamber where the pressure is to be measured, the second device comprising:
      a second separation diaphragm; and
      a first cavity containing a pressure-transferring fluid, the first cavity comprising a capillary tube for pressure-transferring connection between the first device and the second device,
  an outer sensor part having a pressure sensing element, where the outer sensor part is attached at a distance from the pipe/chamber where the pressure is to be measured, and where the outer sensor part comprising:
    a second cavity containing a pressure-transferring fluid in pressure communication with the pressure sensing element,
    a third separation diaphragm bounding the second cavity, the third separation diaphragm being configured for pressure communication with the second separation diaphragm for transferral of pressure between the pressure-transferring fluid in the cavity and the pressure-transferring fluid in the second cavity, and
  an additional volume in connection with the first cavity, the additional volume being configured for receiving the pressure-transferring fluid of the first cavity.

It is further described a retrievable pressure sensor for installation in an opening through a pipe or chamber wall for the in-situ measurement of pressure of a process fluid in the pipe/chamber. The pressure sensor includes: a pressure-transferring arrangement comprising a device for sealing attachment in an opening in a wall of the pipe/chamber, a cavity containing a pressure-transferring fluid, a first separation diaphragm for separating between the process fluid and the pressure-transferring fluid, and a second separation diaphragm defining an outer boundary of the cavity containing the pressure-transferring fluid; an outer sensor part having a pressure sensing element, a second cavity containing a pressure-transferring fluid in pressure communication with the pressure sensing element, a third separation diaphragm bounding the second cavity, the third separation diaphragm being configured for pressure communication with the second separation diaphragm for transferring pressure between the pressure-transferring fluid in the cavity and the pressure-transferring fluid in the second cavity, and an additional volume in association with the first cavity, the additional volume being configured for receiving the pressure-transferring fluid of the first cavity.

In an embodiment, the pressure sensor may comprise a first abutment surface for the first separation diaphragm, with the first abutment surface having an opening into the cavity. The pressure sensor may further include a second abutment surface for the second separation diaphragm, with the second abutment surface having an opening into the cavity. Further, an outer section of the second separation diaphragm may be attached to the second abutment surface by way of fasteners in such a manner that the outer section abuts against and contacts a corresponding section of the second abutment surface. The pressure sensor may further include a third abutment surface for the third separation diaphragm, with the third abutment surface having an opening into the second cavity. A second outer section of the third separation diaphragm may be attached to the third abutment surface by way of fasteners in such a manner that the second outer section abuts against and contacts a corresponding outer section of the third abutment surface. The pressure sensor may further be provided with a biasing force pressing the second and third separation diaphragms together so that pressure transfer may take place between the second and third separation diaphragms. The pressure sensor may be adapted for measuring differential pressure or absolute pressure.

In a further aspect, the invention provides a method for retrieving a retrievable pressure sensor as set out above, the method comprising reducing the pressure in the first cavity until the second and third separation diaphragms are no longer in pressure communication, the pressure being reduced through the reception of fluid in the additional volume from the first cavity, and pulling out the outer pressure sensor part.

BRIEF DESCRIPTION OF THE DRAWINGS

In the following, embodiments of the invention will be explained in more detail with reference to the accompanying drawings, in which:

FIG. 3 shows the pressure sensor structure of FIG. 1, with FIG. 3a being an enlarged section of the area in which an outer part of the sensor structure is in pressure-transferring contact with the pressure pad, whereas FIG. 3b shows a further enlarged section showing the two separation diaphragms providing the pressure-transferring contact;

DETAILED DESCRIPTION

Embodiments of the invention will now be described. Corresponding or similar elements are denoted with the same reference numbers throughout the drawings.

Figure 1:
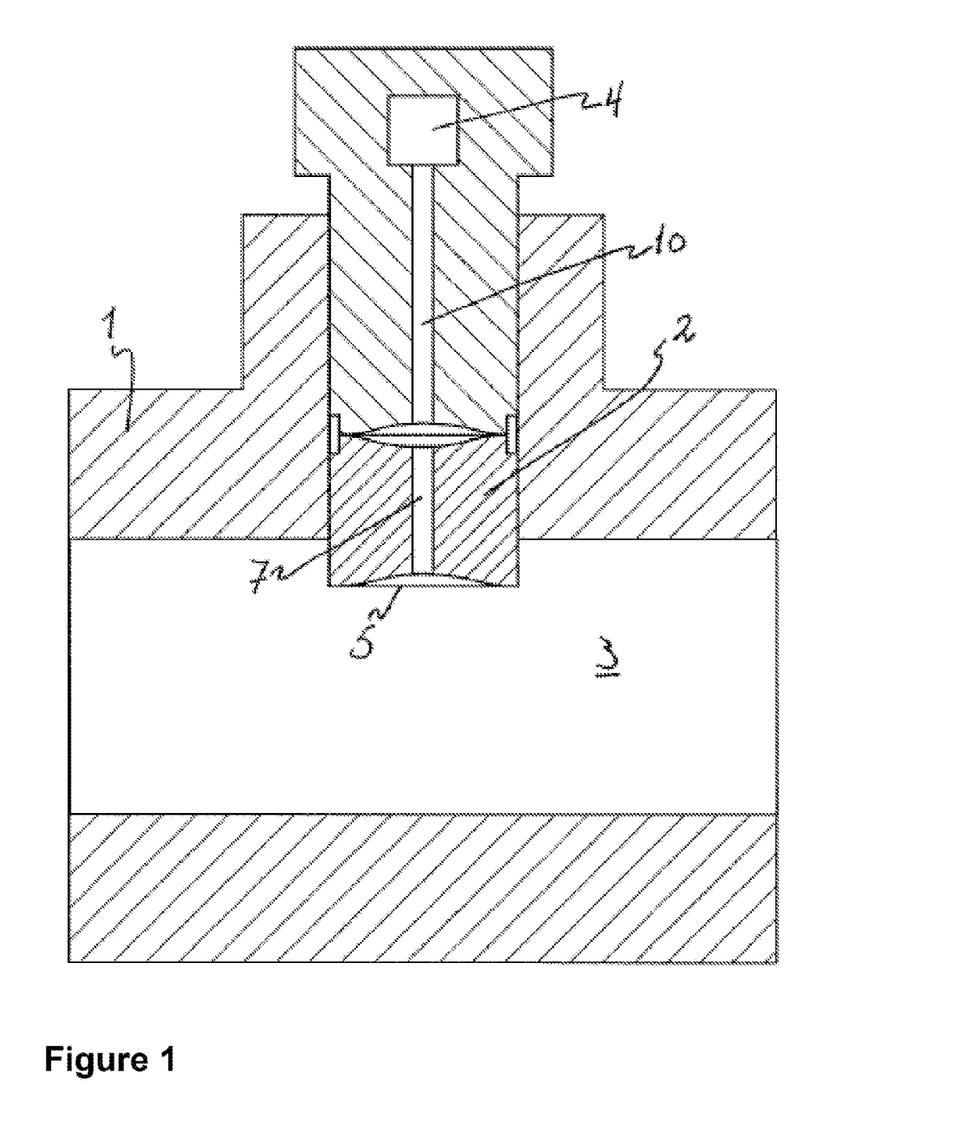
FIG. 1 shows a longitudinal section of a retrievable pressure sensor structure.

FIG. 1 shows a longitudinal section of a retrievable pressure sensor positioned in a bore in a pipe wall 1 for the in-situ measurement of the pressure of a process fluid in the pipe. The pressure sensor may also be positioned in an opening in a chamber wall for measuring pressure of a process fluid in a chamber. The pressure sensor element is located at a distance from the measurement area and disposed on the outside of the pipe wall. Pressure transfer is accomplished by way of separation diaphragms and pressure-transferring fluid provided behind and between the separation diaphragms and in pressure communication with the process fluid in the pipe.

The pressure sensor structure of FIG. 1 is comprised of an outer pressure sensor part in which the sensor element 4 is positioned, and a lower pressure-transferring part (pressure pad) 2 positioned so as to face the process fluid to be measured. The pressure sensor part and the pressure-transferring part 2 are positioned in a closely adjoining relationship so that pressure transfer can be accomplished through separation diaphragms and pressure-transferring fluid. The pressure-transferring part 2 is sealingly attached to the pipe wall and remains in place when the sensor part is removed. The pressure-transferring part 2 may be hermetically welded to pipe 1 or attached by way of a flange or otherwise in order to ensure a sealing engagement against the pipe wall and process fluid inside the pipe.

The pressure-transferring part (pressure pad) 2 has a separation diaphragm at each end. The diaphragms may be equal or different. Each separation diaphragm has an associated diaphragm seat. Both diaphragm seats have seat holes small enough for the respective diaphragms to flatten onto their respective seats and then be able to support the entire pressure from the process fluid 3 and an ambient pressure, accordingly. Typically, the holes/openings of the diaphragm seat are of the same order of magnitude as the thickness of the separation diaphragms. A typical thickness for the separation diaphragms is 0.05 mm and a typical diameter of the openings/holes is 0.25 mm. The pressure-transferring part is exposed to the ambient pressure when the pressure sensor part is removed.

The pressure sensor structure with the pressure-transferring part provides a tight barrier when in place in the pipe. The attachment of the outer pressure sensor part and inner pressure-transferring part as well as replacement procedures will be explained later.

Figure 2:
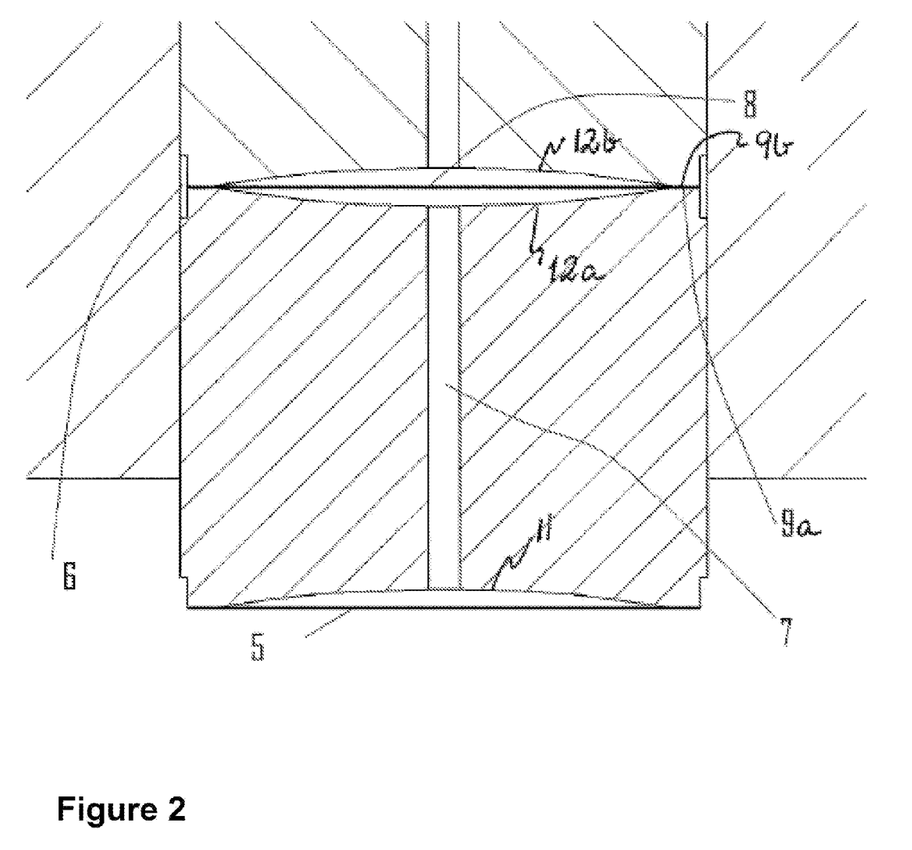
FIG. 2 shows a cross-section of a lower part of the sensor structure of FIG. 1, with the lower part of the sensor structure being constituted by a pressure-transferring arrangement facing a pressure that is to be measured.
Figure 3:
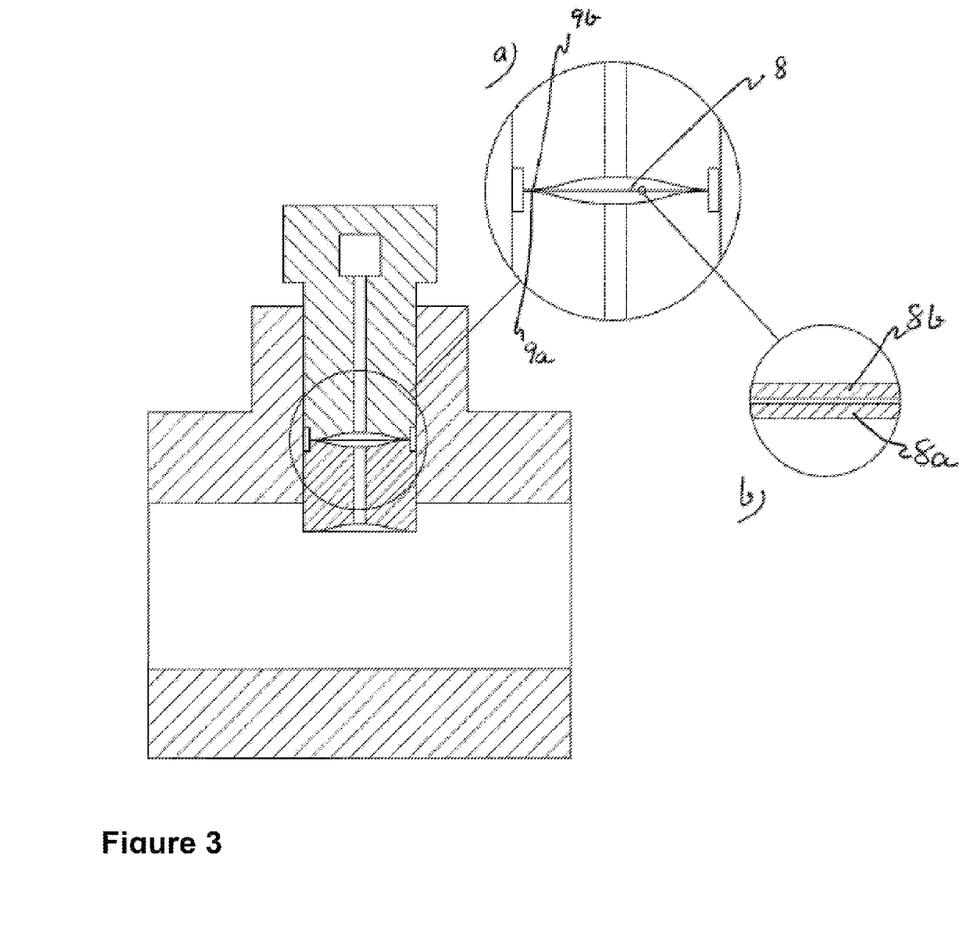

FIG. 2 shows a cross-section of the lower part of the outer pressure sensor part of FIG. 1 which is in communication with the fluid in the pipe in which the pressure is to be measured, as well as the area in which the outer pressure sensor part and the inner pressure-transferring part contacts each other.

The inner pressure-transferring part, or pressure pad, is comprised of, as seen from the innermost component facing the process fluid to the contact area, a diaphragm 5 with an underlying abutment surface/diaphragm seat 11 for the diaphragm, a hydraulic pipe/bore 7, an abutment surface 12a for a second diaphragm 8a, and the second diaphragm 8a. Diaphragm 5 provides a barrier against the process fluid, and constitutes a so-called "process diaphragm" separating the inner pressure-transferring environment of the pressure sensor from the external process environment. On the inside thereof, the process diaphragm 5 has a first concave abutment surface against which it can abut and which prevents the process diaphragm from rupturing should the pressure of the process fluid become too high. In the first concave abutment surface 11 there is an opening into hydraulic pipe 7. Hydraulic pipe 7 leads into a second opening in a second concave abutment surface 12a for the second diaphragm 8a. The second separation diaphragm 8a is exposed to the ambient pressure when the outer pressure sensor part is removed. The process diaphragm 5 and the second diaphragm 8a at the contact surface with the outer sensor element, together with the first and second abutment surfaces and hydraulic pipe 7, defines a first cavity containing a pressure-transferring fluid. The pressure-transferring fluid may be a hydraulic liquid, such as hydraulic oil, for example.

In succession, the outer pressure sensor part is comprised of a third diaphragm 8b, a third concave abutment surface/diaphragm seat 12b for the third diaphragm, a second hydraulic pipe/bore 10 in the third diaphragm, with the pipe leading into the pressure sensor assembly in cavity 4. The third diaphragm 8b at the contact surface with the inner pressure-transferring part, together with the third abutment surface 12b, pipe 7, and an outer boundary of the pressure sensor assembly, form a second cavity containing a pressure-transferring fluid. The pressure-transferring fluid may be a hydraulic liquid, such as hydraulic oil, for example. The second cavity is in pressure communication with a pressure sensor 4. The outermost part of the pressure sensor part may be shaped as a flange section in order to also provide a seal around the outer end of the pipe wall opening.

The second 8a and third diaphragms 8b are attached to their respective abutment surfaces by fasteners in such a manner that an outer section 9a, 9b of these diaphragms abut against and contact a corresponding section 9a, 9b of the underlying abutment surfaces at all times. Preferably, the outer sections 9a, 9b of the diaphragms are annular. This prevents the outer sections of the separation diaphragm from losing the contact with the abutment surface/diaphragm seat. The fasteners may be in the form of screws with underlying springs. The separation diaphragm is comprised by a thin foil, and the existence of a hydraulic pressure differential across the separation diaphragm is avoided so that it will not rupture. The diaphragms used in the present invention could be of the type described in the applicant's own patent application NO20093171, which is hereby incorporated by reference, but could also be other types of separation diaphragms. Diaphragms 8a and 8b, being in contact with each other and forming the transfer surface between the inner and outer sensor parts, have complementary geometrical shapes. Process diaphragm 5, however, may be different from diaphragms 8a and 8b at the contact surface.

Figure 4:
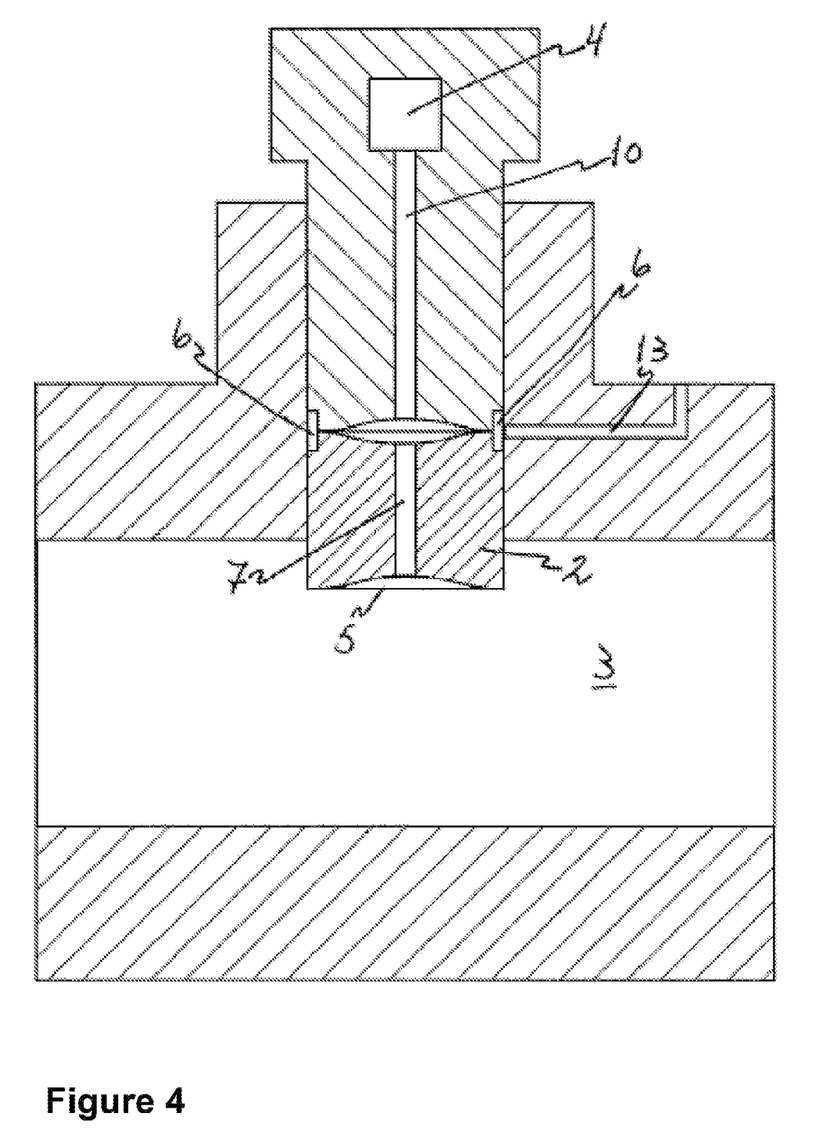
FIG. 4 shows a longitudinal section of a retrievable pressure sensor structure according to a further embodiment of the invention.

A third volume 6 surrounds the second and third diaphragms at the contact area for the inner and outer parts of the retrievable sensor. In the embodiment shown in FIG. 2, the third volume is annular. This annular volume may be closed and sealed off by an O-ring, for example, or another sealing means. The annular volume may also be open 13 so that fluid can be injected as shown in FIG. 4. In use subsea, the fluid may be seawater from the surroundings. When the annular volume is open, the pressure of volume 6 is adjustable. This pressure adjustment can be utilized for retrieving the sensor in a controlled and safe manner.

Figure 5:
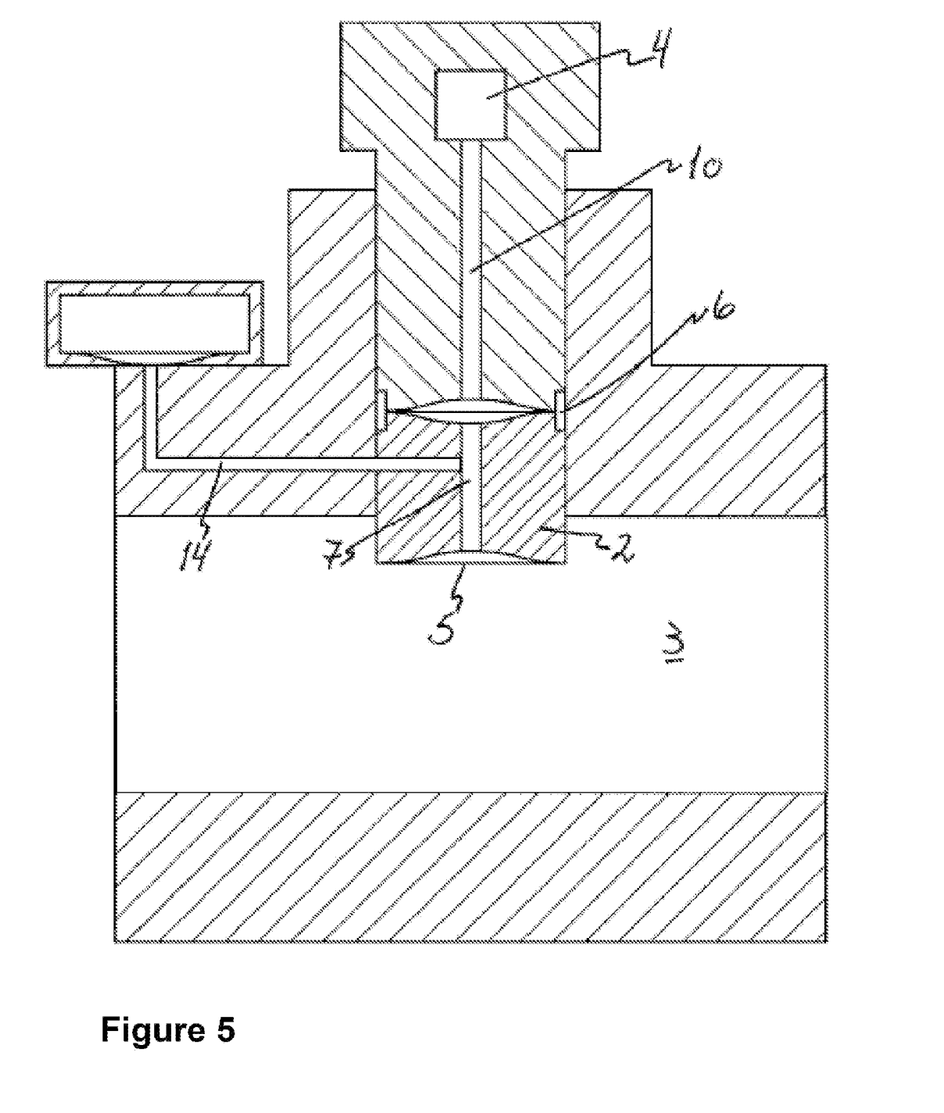
FIG. 5 shows a longitudinal section of a retrievable pressure sensor structure according to a still further embodiment of the invention.

FIG. 5 shows an embodiment of the retrievable pressure sensor in which a fourth volume 14 is provided in connection with the first cavity 7 in the pressure pad. This fourth cavity 14 is adapted for receiving the pressure-transferring fluid in cavity 7 so as to enable adjustment of the pressure of the transfer fluid in cavity 7. The fourth cavity 14 may be bounded by a pressure adjustment mechanism as shown in FIG. 5. In FIG. 5, this pressure adjustment mechanism includes a diaphragm in association with a cavity in which the pressure is controllable. Such pressure adjustment may be utilized for retrieving the sensor in a controlled and safe manner. The cavity may be isolated from the surroundings. The annular volume 6 of FIG. 5, enclosing the second and third diaphragms at the contact area for the inner and outer parts of the retrievable sensor, may be closed and sealed off by an O-ring, for example, or another sealing means.

Figure 6:
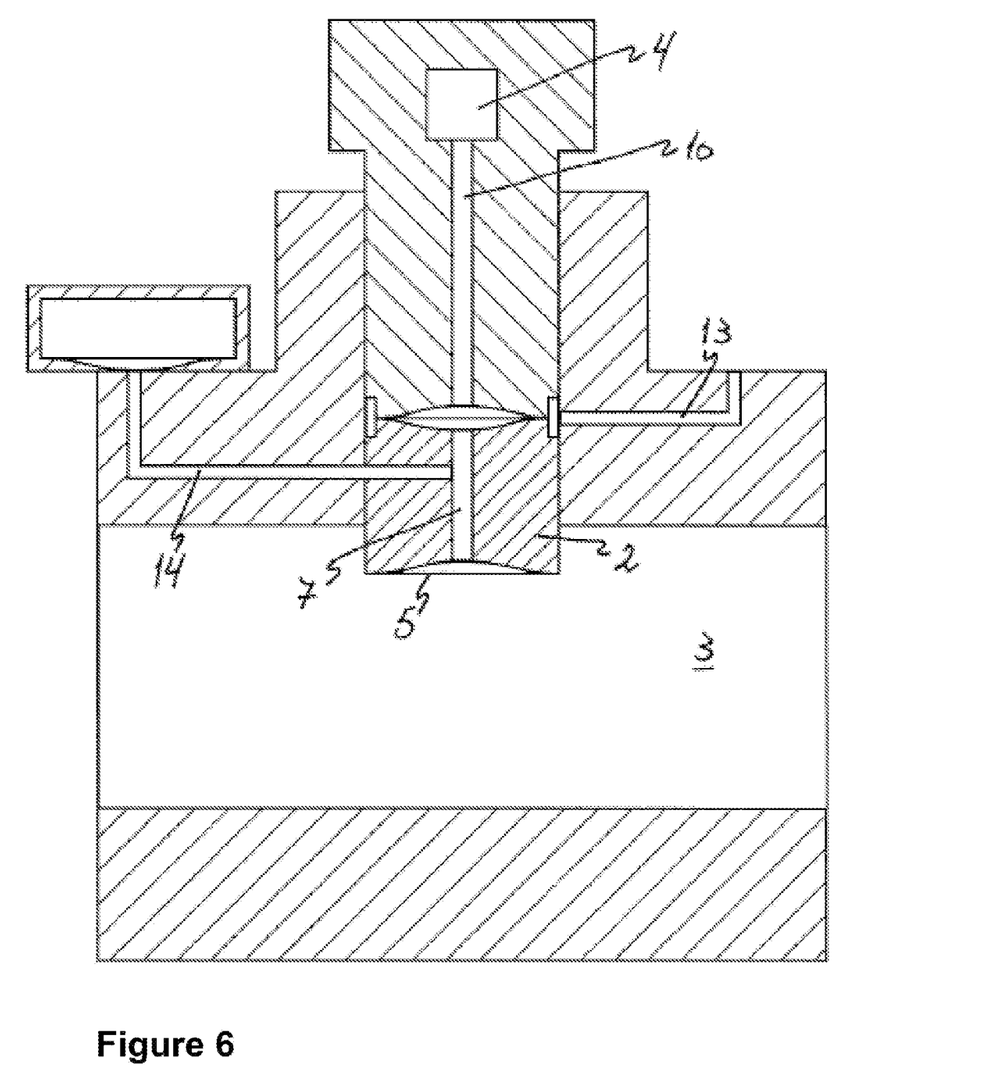
FIG. 6 shows a longitudinal section of a retrievable pressure sensor structure according to yet a still further embodiment of the invention.

A further embodiment is shown in FIG. 6, comprising a fourth cavity 14 adapted for receiving the pressure-transferring fluid from cavity 7 as well as an opening 13 into the annular volume 6 for the injection of water from the surroundings. Hence, in this embodiment, pressure adjustment in both the annular volume 6 and cavity 7 is utilized for retrieving the sensor in a controlled and safe manner.

The pressure pad is shaped so as to be able to resist a large pressure difference between the pressures of the process fluid 3 and third volume 6. This prevents the pressure pad from rupturing when the pressure sensor (i.e. the part containing volume 4) is removed. When the pressure sensor has been put in place in the pipe wall, the pressure sensor is provided with a biasing force pressing the two diaphragms 8a and 8b together so that pressure transfer can be accomplished and the process pressure measured. This biasing force is sufficiently high to prevent the surface pressure on the outer surface 9a from becoming zero even with the highest process pressure 3 possible.

Pressure sensor 4 measures the pressure of the process fluid in pipe 3 when the pressure in the third volume 6 is lower than the pressure of the process fluid. Pressure sensor 4 measures the higher of the process fluid pressure and the pressure in the third volume 6. This may be used for calibration.

Figure 7:
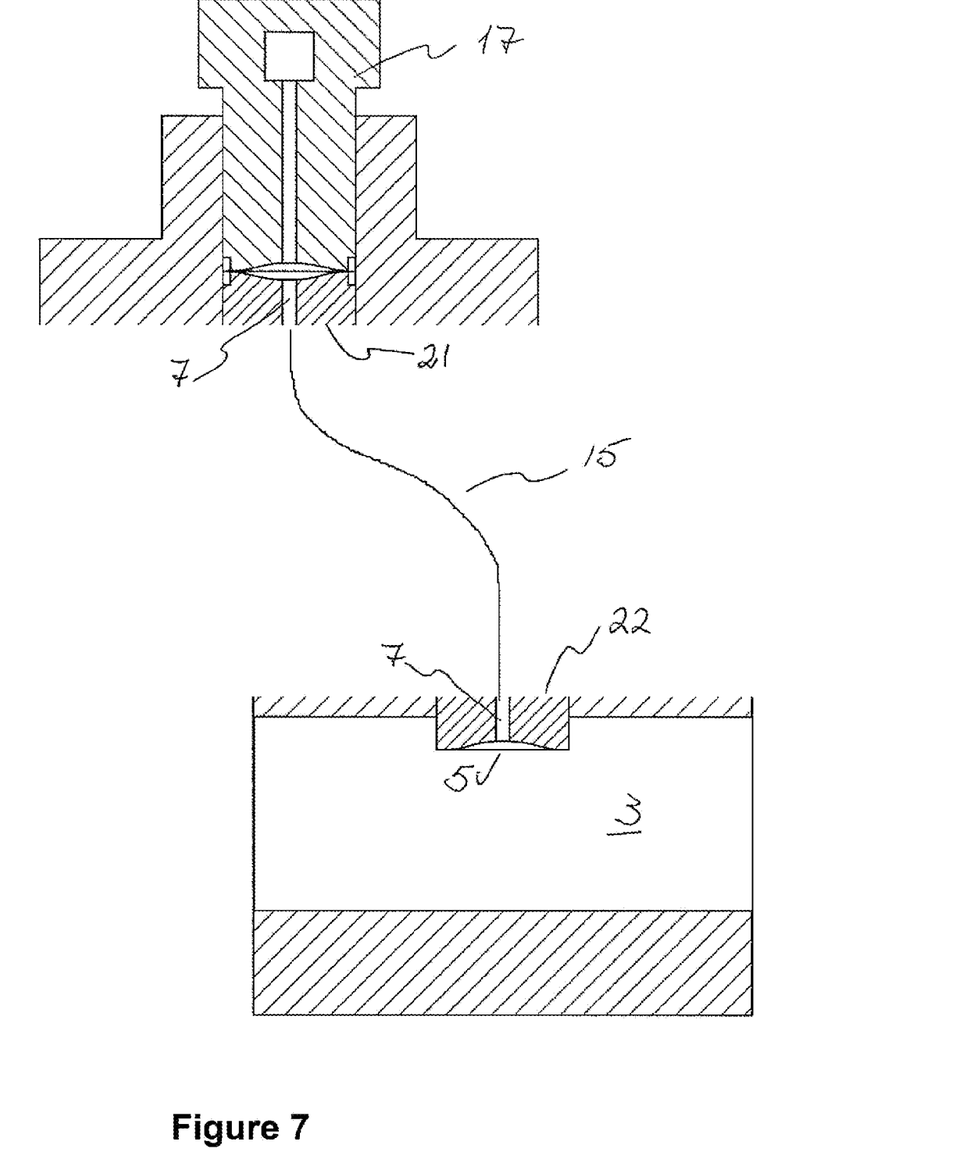
FIG. 7 shows an alternative embodiment of the retrievable pressure sensor structure shown in FIG. 1 according to an embodiment of the invention.
Figure 8:
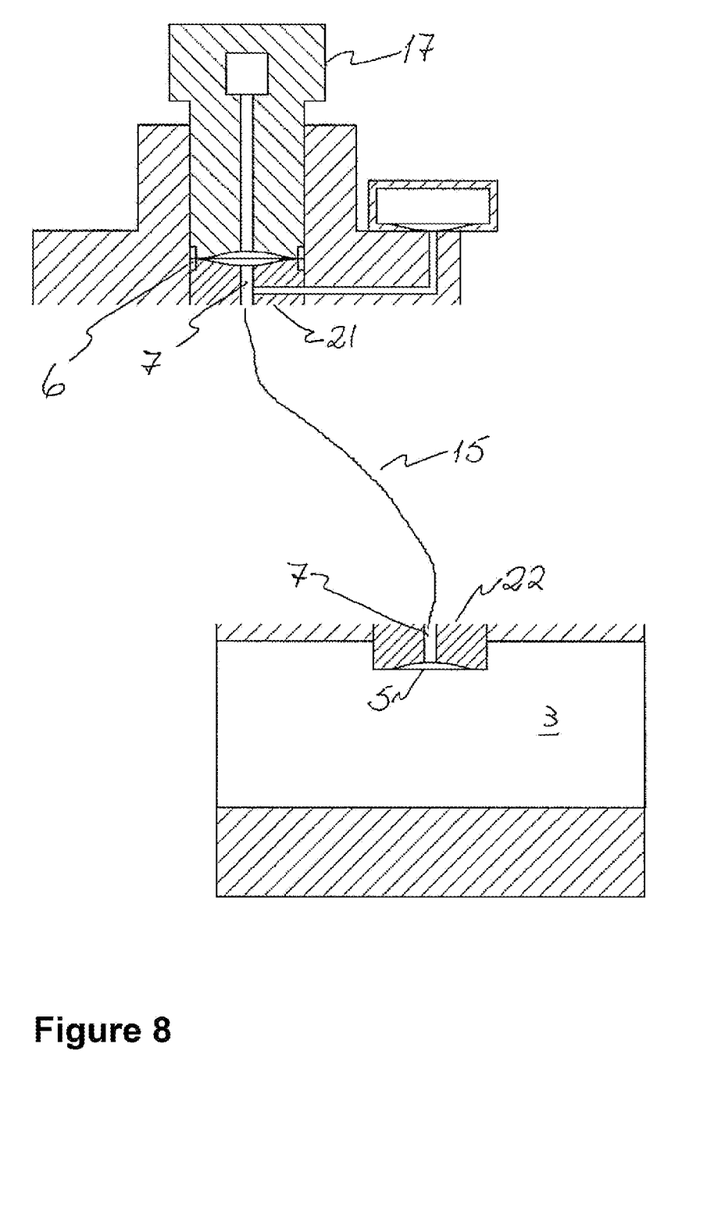
FIG. 8 shows an alternative embodiment of the retrievable pressure sensor structure shown in FIG. 5 according to an embodiment of the invention.
Figure 9:
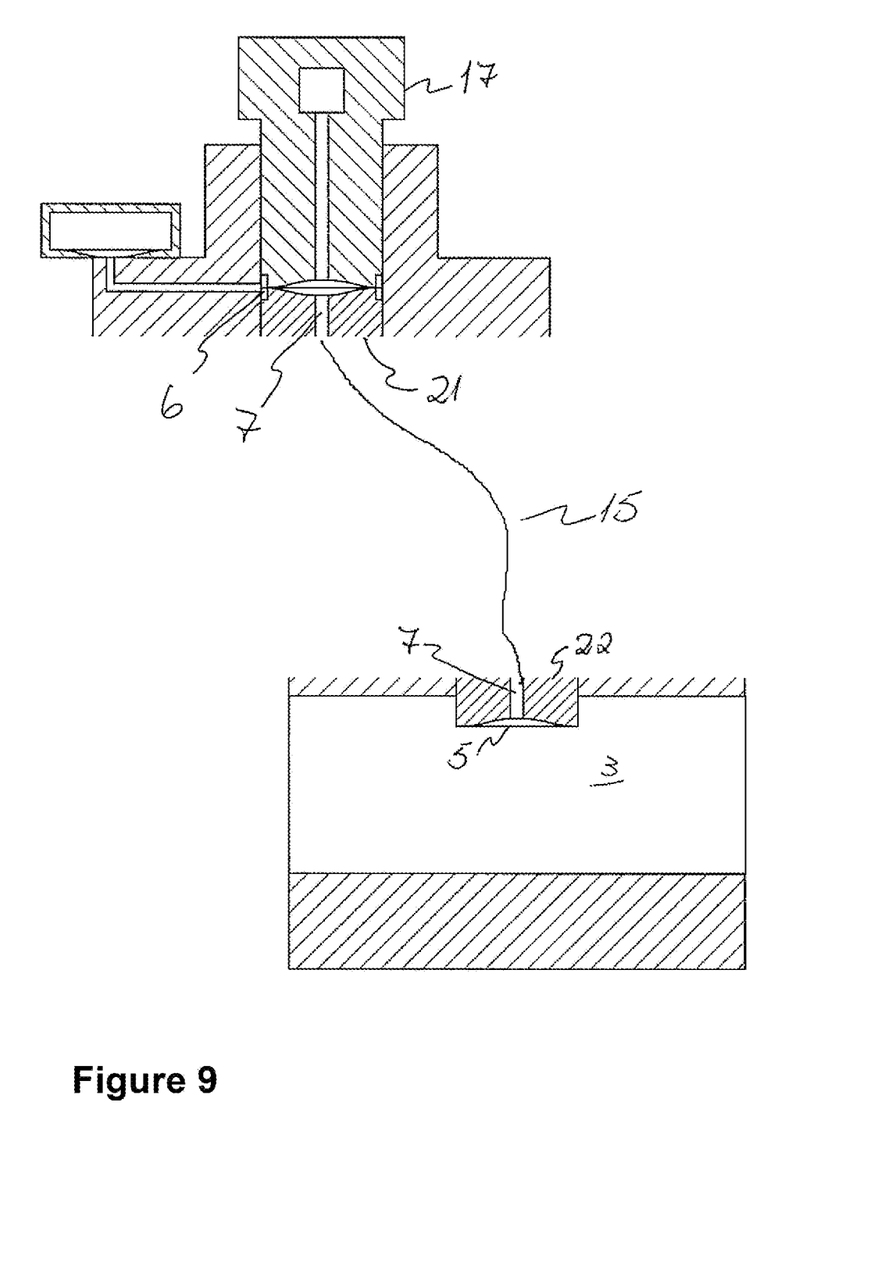
FIG. 9 shows an alternative embodiment of the retrievable pressure sensor structure shown in FIG. 4 according to an embodiment of the invention.

The present invention concerns a retrievable pressure sensor construction where the retrievable pressure sensor part is arranged at a distance from the pressure transferring diaphragm 5 which is provided facing the process fluid 3 where the pressure is to be measured. FIGS. 7, 8 and 9 show embodiments of the invention for the retrievable pressure sensor constructions that are shown in FIGS. 1, 5 and 4 accordingly. The outer sensor part may be arranged at a long distance from the inner pressure transferring part itself. Typical distances in an underwater installation may be up to 5-10 meters. The outer pressure sensor part is arranged in an accessible panel, on an accessible wall or the like of the underwater installation in order for the retrievable pressure sensor unit is accessible for maintenance and replacement by use of an ROV. The outer sensor part may be arranged in a flange device or attached in another way to ensure sealing attachment. The outer sensor part 17 may be sealingly attached in a bore in the flange 16. An outer part 21 of the pressure transferring pad is sealingly attached in the bore in the flange in the accessible panel and remains in place when the outer sensor part 17 with the pressure sensing element 4 is removed. An inner part 22 of the pressure transferring element 2 is sealingly attached in a flange in the pipe wall/chamber wall where the process pressure is to be measured. The pressure transferring part is accordingly sealingly attached both in the outer accessible panel and in the pipe wall in the measuring point itself, and constitutes a sealing barrier against the surroundings.

The pressure transferring part 2 is provided with a capillary tube 15 connecting the inner 22 and the outer part 21 of the pressure transferring element. The volume of the capillary tube 15 is small in order for the pressure to be correctly transferred between the inner 22 and outer part 21 of the pressure pad 2. The capillary tube constitutes a part of the first cavity 7 and is accordingly filled with the same pressure transferring fluid.

The pressure transferring pad is in an embodiment divided in two. In this embodiment the capillary tube is sealingly welded to the hydraulic pipe/bore 7 in the inner 22 and the outer 21 part, accordingly, of the pressure pad and constitutes a connecting channel between the hydraulic pipe/bore 7 in the inner and the outer part. The capillary tube is made of corrosion resistant material, e.g. stainless steel or Inconel. The capillary tube may also be surrounded by a protective covering/coating.

In an alternative embodiment the pressure transferring part 2 runs from the outer wall and in to the measuring point itself in the pipe/chamber with process fluid. The capillary tube is arranged inside the long pressure transferring element 2 and connects the hydraulic pipe/bore 7 in the outer 21 and the inner 22 part. Only the capillary tube itself is shown in FIGS. 7, 8 and 9.

Like the embodiments in the FIGS. 1-6 the pressure pad in the embodiments 7, 8 and 9 are designed to withstand large pressure differences between the pressure in the process fluid 3 and the third volume 6. This prevents the pressure pad to be destroyed when the pressure sensor (i.e. the part comprising the available volume 4) is removed. When the pressure sensor is arranged in place in the accessible panel, the pressure sensor is provided with a prestressing force pressing the two diaphragms 8a and 8b together, in order for pressure transferral to take place and the pressure to be measured. This prestressing force is adequately high in order for the surface pressure on the outer surface 9a to never become zero even at the highest possible process pressure 3.

In the embodiment shown in FIG. 8 it is provided an adjustable volume for receiving pressure transferring fluid in the first cavity 7 in the pressure transferring pad 2. In the embodiment shown in FIG. 9 it is provided an adjustable volume in connection with the annular volume 6. The adjustable volumes are used in controlling the pressure in the first cavity and in the annular volume 6 accordingly, and are being used in connection with retrieving and calibrating which will be explained below. It is also possible to provide the embodiments shown in FIGS. 8 and 9 with further adjustable volumes both for controlling the pressure in the first cavity and in the annular volume, which is previously shown in FIG. 6.

Methods for Replacing (Retrieving) the Pressure Sensor

The pressure sensor may be pulled out in the case where the pressure of the transfer oil 7 is lower than the pressure in the third cavity 6. It is sufficient that the pressures in the third cavity 6 and first cavity 7 are equal or that a very small pressure difference exists where the first cavity 7 has a slightly lower pressure than the third cavity 6. This pressure difference can be of the order of millibar. The order of magnitude of the pressure difference can be allowed to be in the 10 mbar range, i.e. from 1-100 mbar.

At the contact area thereof, the second separation diaphragm 8a is flat or pressed down against its diaphragm seat when the outer pressure sensor assembly with the third separation diaphragm 8b is pulled out, in order to prevent the second separation diaphragm 8a from rupturing. FIGS. 3a and 3b are enlarged sections of the contact area for the separation diaphragms 8a and 8b. In FIG. 3b, the separation diaphragms are parallel and plane, and consequently in a position that allows the outer pressure sensor assembly to be pulled out.

If the second separation diaphragm 8a ruptures, the process diaphragm 5 will represent a barrier against the process fluid. The process diaphragm 5 and the associated first abutment surface are shaped so that the diaphragm 5 may fully abut against the abutment surface and consequently be able to resist extremely high pressures, up to 2000 bar, without rupturing.

In an embodiment, it is possible to provide the pressure-transferring arrangement with an additional double diaphragm assembly between process diaphragm 5 and the first separation diaphragm 8a. Such a design will provide a double barrier system.

Replacement of the pressure sensor may be accomplished in various alternative ways, as explained below.

1) A first alternative is to reduce the pressure of the process fluid 3 until it is lower than the pressure in the third cavity 6. This requires, however, that the process pressure is adjustable.

2) A second alternative method includes increasing the pressure in the third cavity/volume 6 until it is higher than that of the process fluid 3. There is only a small space between the pressure sensor and pipe wall, so that the pressure in the third cavity 6 can be increased by way of a pressure connection 13 as shown in FIGS. 4 and 5. When the pressure in the transfer oil 7 is lower than the pressure in the third cavity 6, this fluid pressure will provide a splitting of the separation diaphragms 8a and 8b. When the pressure in the third cavity 6 is higher than the pressure in the process fluid 3 and hence also in the cavity 7, the pressure sensor is pulled a little outwards in a controlled manner. At the same time, in this inter-mediate position, a large hydraulic force will act on the sensor. After the pressure sensor has been controllably pulled a little outwards, the pressure in the third volume 6 is released (the pressure is lowered), and the complete outer sensor part may thereafter be pulled out. The inner pressure-transferring part/pressure pad 2 will remain in place in the pipe wall and seal against the process fluid. Insertion of a new pressure sensor is accomplished by reversing the above process. In a controlled manner, the pressure sensor is introduced almost all the way in, the pressure in the third cavity/volume is increased, the pressure sensor is pushed in place against pressure pad 2, and the pressure in the third cavity is reduced to a pressure which is lower than the process pressure.

Increasing the pressure in the third cavity 6 to a higher level than the process fluid 3 may also be used for calibrating the pressure sensor in a pressure range from the process pressure and upwards.

3) A third alternative method includes introducing a variable volume 14 as shown in FIG. 5 in connection with the first volume 7 in the pressure pad 2. This variable volume 14 makes it possible to reduce the pressure of the transfer oil inside the first volume 7. In this alternative, the arrangement, introducing the variable volume and thereby the variable pressure in the first volume 7, maintains the pressure in the first volume 7 so that the sensor can be operated, and lowers the pressure in volume 7 so that the outer pressure sensor assembly can be removed. Inserting a new pressure sensor can be accomplished by reversing the above process. The pressure sensor is pushed in a controlled manner all the way to the pressure pad and fastened. The pressure of the transfer oil in the first volume 7 is then increased to the operating pressure. This embodiment may be used for calibrating the pressure sensor in the pressure range from the process pressure and downwards.

4) Any combinations of the above alternatives are also possible.

The pressure testing and/or calibration device and method are applicable both for differential pressure sensors and for absolute pressure sensors. The exemplary embodiments shown in the drawings and described above are shown and explained for a sensor for measuring absolute pressure. The pressure pad and pressure sensor structure, as well as the methods for retrieving the sensor according to the invention, are also applicable for differential pressure sensors. For that case, the only difference is that at least two pressure sensor structures are arranged in connection with each other and are connected for measuring differential pressure.

Replacement (retrieving) of the pressure sensor in the embodiments shown in FIGS. 7, 8 and 9 are performed in the same manner as for the pressure sensor in the embodiments 1-6, and which are described above. The outer pressure sensor part and the outer part 21 of the pressure pad 2 are however attached in the flange 16 in the outer panel/wall and not in the pipe wall itself.

Calibration and Testing

In a measurement situation the pressure sensor structure shown in FIG. 5 and FIG. 6 will sense the process pressure $P_p$ of the process fluid 3, provided that the pressure $P_S$ (control pressure) in the fourth volume 7 is higher than the process pressure.

The pressure sensor may be tested in situ in order to check that it is intact and still measures the correct pressure. The testing is performed in that the control pressure is made lower than or equal to the process pressure. When the pressure in the fourth volume 7 is lower than the pressure of the process fluid, the measurement pressure $P_1$ sensed by the sensor corresponds to the pressure $P_S$ in the fourth volume 7. In testing a known pressure is used as the control pressure $P_S$, and consequently the sensor is intact if the pressure measured corresponds to the applied control pressure. Calibration of the sensor may be performed by using different known values for the control pressure, which is thereby sensed by the sensor. The measured pressure values are compared with the applied pressures. This embodiment may be used for calibrating the pressure sensor in a pressure range from the process pressure and downwards.

In a further embodiment, the pressure sensor structure shown in FIG. 6 can be used for calibrating and testing the pressure sensor in a pressure range from the process pressure and upwards. This requires that the second control pressure, $P_r$, which may be applied across the annular volume 6 thereby splitting separation diaphragms 8a and 8b, is set higher than or equal to the process pressure $P_S$. In this configuration (FIG. 6), pressure sensor 4 will measure the pressure in the annular volume 6 and may therefore be used for calibrating and testing the pressure sensor in a pressure range/pressure interval from the process pressure and upwards. The measured pressure values are compared with the applied annulus pressure(s) $P_r$.

Such a device may advantageously be used for sensors operating on the seafloor in petroleum related applications. Such sensors are subject to strict requirements on operational safety and solidity, and the costs associated with sensor replacement are high. Testing and possibly calibration of the sensor can be easily performed by running a ROV down to the installation and reducing the control pressure $P_S$ to known pressure values in a controlled manner while the pressure is sensed by the sensor 4. The measured pressures are compared with the applied pressures. An example of a known pressure value that may be used could be the pressure of the ocean depth at the sensor location. Such testing can extend the operational lifetime of the pressure sensor. The pressure sensor is then only replaced when it actually does no longer function, as opposed to being replaced after a pre-determined number of years.

The use of a closed hydraulic pipe and optionally a diaphragm in connection with the control pressure $P_S$ creates a closed pressure testing structure that satisfies the strict zero discharge requirement regulations in subsea petroleum applications. An example of such a structure is shown in FIG. 5.

The testing and calibration according to the above embodiments can be performed over small intervals within a large test and calibration range. The calibration and testing may be performed continuously over one or more pressure ranges/intervals, or at points within one or more pressure ranges/intervals.

In subsea oil and gas applications, the process pressure, and thereby also the control pressure, is often in the order of a few hundred bars, whereas the equipment and hence also pressure sensors are designed for resisting up to 1000 bars. The pressure sensor structure according to the present invention is able to sense small pressure changes of magnitude 1 mbar.

Calibration and testing of the pressure sensor in the embodiments shown in FIGS. 7, 8 and 9 are performed in the same manner as for the pressure sensor in the embodiments 1-6, and which are described above. The outer pressure sensor part and the outer part 21 of the pressure pad 2 are however attached in the flange 16 in the outer panel/wall and not in the pipe wall itself.

Various other modifications and variants are also contemplated within the scope of the invention, as defined by the accompanying patent claims.

The invention claimed is:

1. A retrievable pressure sensor for in situ measurement of pressure in a process fluid in a pipe/chamber, the pressure sensor comprising:
   a pressure-transferring device comprising:
      a first device for sealing attachment in an opening in a wall of the pipe/chamber where the pressure is to be measured, the first device comprising:
         a first separation diaphragm for separating between the process fluid and a pressure-transferring fluid,
      a second device for attachment at a distance from the pipe/chamber where the pressure is to be measured, the second device comprising:
         a second separation diaphragm; and
      a first cavity containing the pressure-transferring fluid, wherein the first cavity comprising a capillary tube for a pressure transferring connection between the first device and the second device,
   and where the pressure sensor further comprising:
      an outer sensor part having a pressure sensing element, where the outer sensor part is attached at a distance from the pipe/chamber where the pressure is to be measured, the outer sensor part comprising:
      a second cavity containing a pressure-transferring fluid in pressure communication with the pressure sensing element,
      a third separation diaphragm bounding the second cavity, the third separation diaphragm being configured for pressure communication with the second separation diaphragm for pressure transferal between the pressure-transferring fluid in the cavity and the pressure-transferring fluid in the second cavity; and
      a volume surrounding respective outer peripheries of the second and the third separation diaphragms when the second and the third separation diaphragms are in pressure communication, a pressure in the volume surrounding respective outer peripheries of the second and the third separation diaphragms being adjustable.

2. The pressure sensor of claim 1, wherein the volume surrounding respective outer peripheries of the second and the third separation diaphragms is adapted for the injection of fluid.

3. The pressure sensor of claim 1, further comprising a first abutment surface for the first separation diaphragm, the first abutment surface having an opening into the cavity.

4. The pressure sensor of claim 1, further comprising a second abutment surface for the second separation diaphragm, the second abutment surface having an opening into the cavity.

5. The pressure sensor of claim 4, wherein an outer section of the second separation diaphragm is attached to the second abutment surface by way of fasteners in such a manner that the outer section abuts against and contacts a corresponding section of the second abutment surface.

6. The pressure sensor of claim 1, comprising a third abutment surface for the third separation diaphragm, the third abutment surface having an opening into the second cavity.

7. The pressure sensor of claim 6, wherein a second outer section of the third separation diaphragm is attached to the third abutment surface by way of fasteners in such a manner that the second outer section abuts against and contacts a corresponding outer section of the third abutment surface.

8. The pressure sensor of any claim 1, wherein the pressure sensor is provided with a biasing force pressing the second and third separation diaphragms together so that pressure transfer may take place between the second and third separation diaphragms.

9. The pressure sensor of claim 1, comprising an additional volume in association with the first cavity, the additional volume being configured for receiving the pressure-transferring fluid of the first cavity.

10. The pressure sensor of claim 1, wherein the pressure sensor is configured for measuring a differential pressure.

11. The pressure sensor of claim 1, wherein the pressure sensor is configured for measuring absolute pressure.

12. A method for retrieving a retrievable pressure sensor according to claim 1, the method comprising:
increasing a pressure in the volume until it is higher than that of the process fluid,
pulling out the outer pressure sensor part in a controlled manner until the second and third separation diaphragms are no longer in pressure communication,
reducing the pressure in the volume to a pressure equal to or lower than the process pressure, and
pulling out the outer pressure sensor part.

13. A method for retrieving a retrievable pressure sensor as indicated in claim 1, wherein the retrievable pressure sensor further includes an additional volume in association with the first cavity, the method comprising:
reducing the pressure in the first cavity until the second and third separation diaphragms are no longer in pressure communication, with the pressure being reduced through the reception of fluid in the additional volume from the first cavity, and
pulling out the outer pressure sensor part.

14. The pressure sensor of claim 1, wherein the volume is adapted for the injection of fluid.

15. A retrievable pressure sensor for in situ measurement of pressure in a process fluid in the pipe/chamber, the pressure sensor comprising:
a pressure-transferring device comprising:
a first device for sealing attachment in an opening in a wall of the pipe/chamber where the pressure is to be measured, the first device comprising:
a first separation diaphragm for separating between the process fluid and a pressure-transferring fluid, and
a second device for attachment at a distance from the pipe/chamber where the pressure is to be measured, the second device comprising:
a second separation diaphragm; and
a first cavity containing a pressure-transferring fluid, the first cavity comprising a capillary tube for pressure-transferring connection between the first device and the second device,
an outer sensor part having a pressure sensing element, where the outer sensor part is attached at a distance from the pipe/chamber where the pressure is to be measured, and where the outer sensor part comprising:
a second cavity containing a pressure-transferring fluid in pressure communication with the pressure sensing element,
a third separation diaphragm bounding the second cavity, the third separation diaphragm being configured for pressure communication with the second separation diaphragm for the transferal of pressure between the pressure-transferring fluid in the cavity and the pressure-transferring fluid in the second cavity,
a volume surrounding respective outer peripheries of the second and third separation diaphragms when the second and third separation diaphragms are in pressure communication, a pressure in the third volume being adjustable, and
an additional volume in connection with the first cavity, the additional volume being configured for receiving the pressure-transferring fluid of the first cavity.

16. The pressure sensor of claim 15, further comprising a first abutment surface for the first separation diaphragm, the first abutment surface having an opening into the cavity.

17. The pressure sensor of claim 16, further comprising a second abutment surface for the second separation diaphragm, the second abutment surface having an opening into the cavity.

18. The pressure sensor of claim 15, further comprising a second abutment surface for the second separation diaphragm, the second abutment surface having an opening into the cavity.

19. The pressure sensor of claim 18, wherein an outer section of the second separation diaphragm is attached to the second abutment surface by way of fasteners in such a manner that the outer section abuts against and contacts a corresponding section of the second abutment surface.

20. The pressure sensor of claim 15, comprising a third abutment surface for the third separation diaphragm, the third abutment surface having an opening into the second cavity.

21. The pressure sensor of claim 20, wherein a second outer section of the third separation diaphragm is attached to the third abutment surface by way of fasteners in such a manner that the second outer section abuts against and contacts a corresponding outer section of the third abutment surface.

22. The retrievable pressure sensor of claim 15, wherein the pressure sensor is provided with a biasing force pressing the second and third separation diaphragms together so that pressure transfer can take place between the second and third separation diaphragms.

23. The pressure sensor of claim 15, wherein the pressure sensor is configured for measuring differential pressure.

24. The pressure sensor of claim 15, wherein the pressure sensor is configured for measuring absolute pressure.

25. A method for retrieving a retrievable pressure sensor as indicated in claim 15, the method comprising:
reducing the pressure in the first cavity until the second and third separation diaphragms are no longer in pressure communication, with the pressure being reduced through the reception of fluid in the additional volume from the first cavity, and
pulling out the outer pressure sensor part.

* * * * *